United States Patent [19]

Gusching

[11] Patent Number: 4,827,801
[45] Date of Patent: May 9, 1989

[54] OFFSET INDEXABLE FIXTURE

[75] Inventor: Nagle V. Gusching, Sidney, Ohio

[73] Assignee: The Monarch Machine Tool Company, Sidney, Ohio

[21] Appl. No.: 47,910

[22] Filed: May 6, 1987

[51] Int. Cl.⁴ .............................................. B23B 29/24
[52] U.S. Cl. .................................. 74/813 L; 74/813 R
[58] Field of Search ............. 74/813 R, 813 C, 813 L, 74/816, 817, 826, 827, 819, 820, 822

[56] References Cited

U.S. PATENT DOCUMENTS

| | | |
|---|---|---|
| 2,672,773 | 3/1954 | Schofield . |
| 3,054,333 | 9/1962 | Brainard et al. . |
| 3,238,615 | 3/1966 | Leone et al. . |
| 3,422,710 | 1/1969 | Kilmer ................................ 74/813 X |
| 3,540,566 | 11/1970 | Perry et al. . |
| 3,543,392 | 12/1970 | Perry et al. . |
| 3,572,194 | 3/1971 | Cafolla . |
| 3,595,110 | 7/1971 | Topliss ................................ 74/813 X |
| 4,006,651 | 2/1977 | Anderson et al. ............. 74/813 R X |
| 4,080,849 | 3/1978 | Benjamin et al. .................. 74/813 R |
| 4,159,658 | 7/1979 | Parkinson ......................... 74/813 L |
| 4,353,271 | 10/1982 | Pieczulewski ................. 74/813 L X |

FOREIGN PATENT DOCUMENTS 1045673 10/1966 United Kingdom ............. 74/813 R

Primary Examiner—Richard E. Moore
Assistant Examiner—Vinh Luong
Attorney, Agent, or Firm—Pearne, Gordon, McCoy & Granger

[57] ABSTRACT

A rotatable offset indexable fixture is rotatable by being mounted on a work spindle. A faceplate is journaled on the fixture for rotation about an indexing axis parallel to but spaced from the workpiece spindle axis. A workpiece may be secured to the faceplate. First and second cooperable toothed coupling members are concentric with the indexing axis and one is fixed to the rotatable workpiece spindle and the other fixed to the faceplate so that they rotate together about the spindle axis when coupled together. A fluid-actuated piston is provided to relatively move the coupling members along the indexing axis to couple and uncouple the members and for independent rotation of the second coupling member when uncoupled. A first aperture may be machined in the rotating workpiece concentric with the spindle axis and then the faceplate indexed to a second position and a second aperture machined concentric with the spindle axis at a location spaced from the first aperture.

13 Claims, 2 Drawing Sheets

OFFSET INDEXABLE FIXTURE

BACKGROUND OF THE INVENTION

A number of indexable fixtures have been disclosed in the prior art, some for indexing a tool, such as shown in U.S. Pat. No. 3,238,615, and others for indexing a workpiece, such as shown in U.S. Pat. No. 3,054,333. A number of these indexable tables or fixtures use different methods for locating the indexable position of the table, such as an axially parallel shot pin, as shown in U.S. Pat. No. 2,672,773, and others utilize radially disposed teeth, as in U.S. Pat. Nos. 3,540,566; 3,543,392; and 3,572,194. The prior art has also disclosed a 180-degree indexing of such tables, as in U.S. Pat. Nos. 3,238,615 and 3,572,194.

SUMMARY OF THE INVENTION

The prior art indexable tables or fixtures have disclosed an indexing mechanism; however, they have not solved the problem of how to utilize and offset an indexable fixture which in itself is rotatable about an axis different from the indexing axis, so that machining may be carried out with a non-rotating tool. The prior art has intended the table to be indexed to a new position and then remain stationary during subsequent machining, as distinguished from rotating the indexable feature during the machining.

This problem is solved by an offset indexable fixture mountable on a rotatable work spindle comprising, in combination, a backplate adapted to be secured to a rotatable work spindle and rotate therewith about the axis of the spindle, a faceplate, means to journal said faceplate relative to said backplate for rotation about an offset indexing axis parallel to and spaced from said spindle axis, means to secure a workpiece on said faceplate, first and second cooperable coupling members concentric with said indexing axis, means to rotationally fix said first coupling member to said backplate and said second coupling member to said faceplate for concurrent rotation about said spindle axis when coupled together, means to relatively move said first and second coupling members along said indexing axis to couple and uncouple said coupling members for independent rotation of said second coupling member about said indexing axis when uncoupled, whereby a first aperture may be machined in the rotating workpiece concentric with said spindle axis, and whereby upon indexing said faceplate through an angle about said indexing axis and recoupling said coupling members, a second aperture may be machined concentric with said spindle axis in the rotating workpiece at a location spaced from the first aperture.

This problem is further solved by an indexable fixture mountable on a lathe spindle comprising, in combination, a backplate adapted to be concentrically secured to a workpiece spindle of a lathe, a coupling ring secured to said backplate having an indexing axis parallel to and displaced from the axis of said lathe spindle by a predetermined distance, a fluid cylinder in said coupling ring concentric with said indexing axis, a fluid piston axially movable in said fluid cylinder, an axle secured to said piston for longitudinal movement therewith, said coupling ring having first curvic coupling teeth thereon in a plane normal to said indexing axis, a faceplate having second curvic coupling teeth thereon complementary to said first curvic coupling teeth concentric with said indexing axis and mounted for longitudinal movement relative to said coupling ring, a spider longitudinally movable with and journaled on said axle about said indexing axis and secured to said faceplate, spring means acting between said coupling ring and said piston and acting to urge said piston toward said backplate, a fluid pressure inlet to said cylinder, and means on said faceplate to radially and angularly locate a workpiece securable to said faceplate for machining a first aperture in the work piece concentric with said lathe spindle axis, and whereby fluid pressure may be applied to said piston to move said piston away from said backplate and compress said spring means to separate said curvic coupling teeth, whereby said spider, faceplate, and workpiece may be indexed 180 degrees and the fluid pressure released so that the curvic coupling teeth again mesh, and whereby a second aperture may be machined in the workpiece concentric with said lathe spindle axis which is spaced from the first aperture in the workpiece by twice said predetermined distance.

Accordingly, an object of the invention is to provide a rotatable and indexable fixture which is rotatable about an axis offset from the indexing axis.

Another object of the invention is to provide an indexable fixture utilizable on a lathe spindle and cooperable with a non-rotating tool to machine first and second apertures in a workpiece which are spaced apart.

Other objects and a fuller understanding of the invention may be had by referring to the following description and claims, taken in conjunction with the accompanying drawing.

DESCRIPTION OF THE PREFERRED EMBODIMENT

Figure 1:
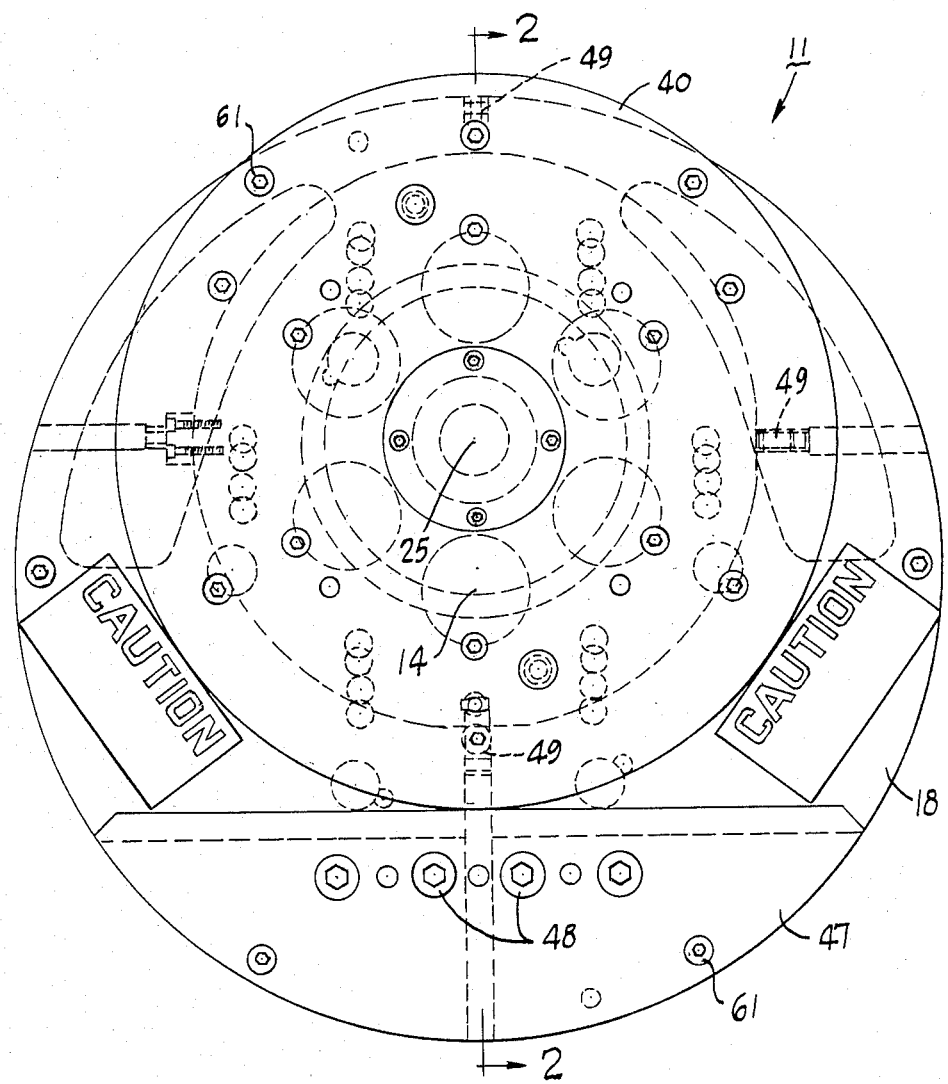
FIG. 1 is a front elevational view of the offset indexable fixture of the present invention, with the workpiece removed.
Figure 3:
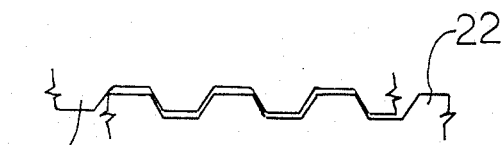
FIG. 3 is a sectional view on line 3—3 of FIG. 2.
Figure 2:
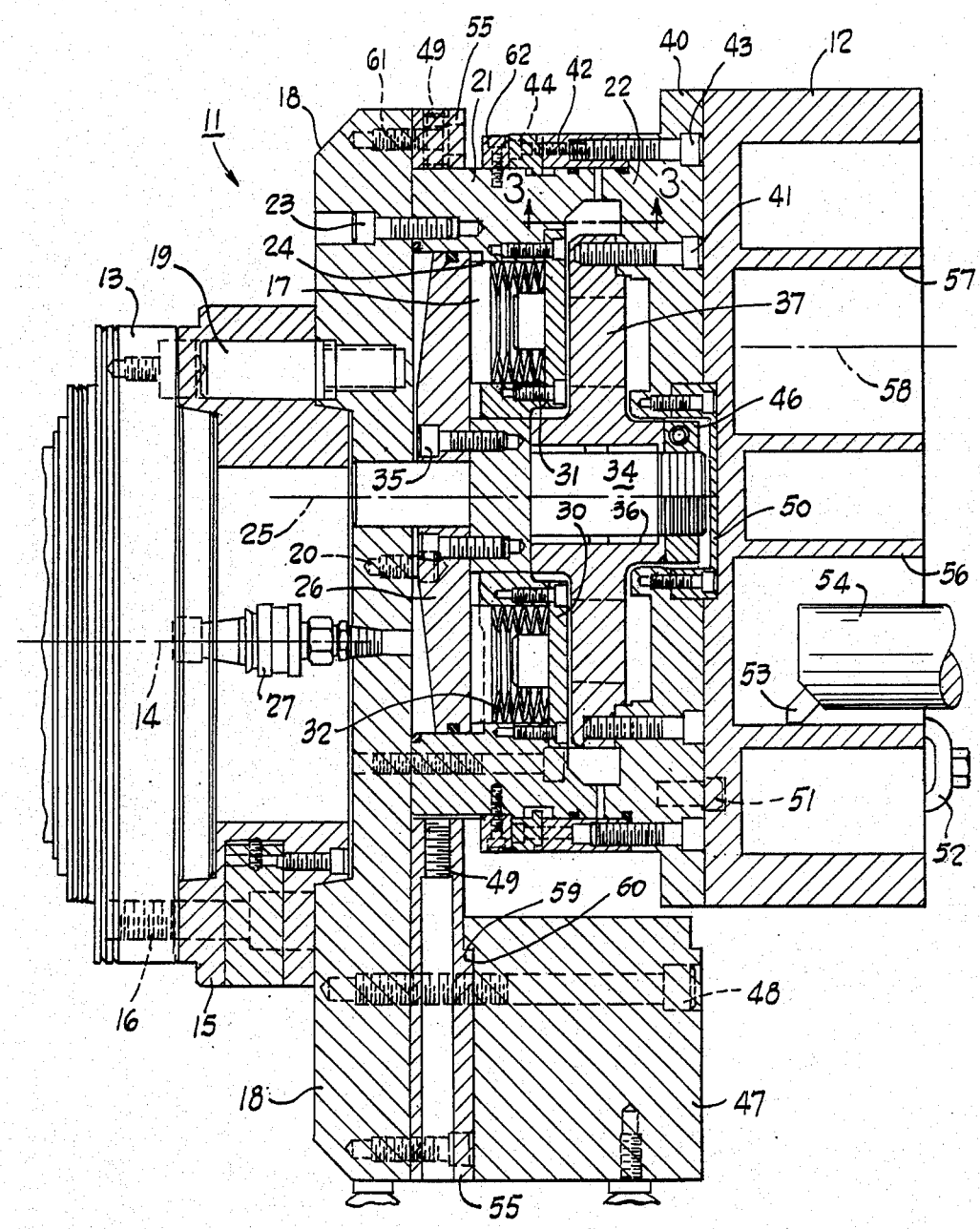
FIG. 2 is a longitudinal, sectional view on line 2—2 of FIG. 1.

FIGS. 1 and 2 illustrate a rotatable, offset, indexable fixture 11 which illustrates the invention. This indexable fixture is designed to be rotated during use for machining a workpiece 12. In the preferred embodiment, this indexable fixture is mountable on a lathe spindle 13 which is rotatable about a spindle axis 14. An adapter plate 15 may be secured to the lathe spindle 13 by machine screws 16, and this adapter plate is concentric with the lathe spindle 13. A circular backplate 18 is secured to the adapter plate 15 by cam studs 19, and is concentric about the spindle axis 14. A first coupling ring 21 is secured to the backplate 18 in an offset manner by screws 23. The interior of this first coupling ring 21 defines a cylinder 24 having an indexing axis 25 offset, that is, spaced from and parallel to the spindle axis 14. A piston 26 is contained within the cylinder 24 and is movable axially along the indexing axis 25 by means of fluid pressure admittable at a coupling 27. A pin 20 in backplate 18 keeps the piston 26 from rotating.

An annular plate 30 is secured by screws 31 to coupling ring 21, and holds a plurality of Belleville spring washers 32 which act between the annular plate 30, circular plug 17, and the piston 26 to urge the piston toward the left as viewed in FIG. 2. An axle 34 is secured to the piston 26 by screws 35, and hence moves axially with the piston 26. Needle bearings 36 journal a spider 37 on this axle 34 for rotation about the indexing axis 25 independently of the axle 34. The faceplate 40 is secured to the spider 37 by screws 41 to rotate with the spider 37. A second coupling ring 22 acts on the faceplate 40 and, as shown, is integral with the faceplate 40 and is cooperable with the first coupling ring 21. These coupling rings 21 and 22 may be considered cooperable toothed coupling members, and in the preferred embodiment, the teeth form a curvic coupling disposed in a plane normal to the indexing axis 25. A ring 42 is secured to the faceplate 40 by screws 43, and this ring is longitudinally slidable on the first coupling ring 21 and trapped thereon by flanged members 44. This ring covers the curvic coupling 21–22 and helps retain the faceplate on the fixture 11. A nut 46 on the axle retains the spider 37 and faceplate 40 for longitudinal movement with the piston 26.

a cap 50 concentric with the indexing axis 25 is secured on the faceplate 40 over the nut 46, and serves to radially orient the workpiece 12 so that it is concentric with the indexing axis 25. A drive pin 51 orients the workpiece in an angular position relative to the faceplate, and securing means 52 is provided to secure the workpiece 12 to the faceplate 40.

An annular plate 55 surrounds the first coupling member 21, and is secured to the backplate by screws 61.

A segment-shaped counterweight 47 acts on the backplate 18 by being secured on the annular plate 55 offset from the spindle axis 14 in the direction opposite the offsetting of the indexing axis 25. A shoulder 59 on the annular plate 55 is substantially parallel to the spindle axis 14, and engages a shoulder 60 on the counterweight 47. This resists the centrifugal force to retain the counterweight in a predetermined position. This counterweight 47 is secured by longitudinal screws 48. Very precise positioning of the exact offset position of the indexing axis 25 relative to the spindle axis 14 is achieved by four adjusting screws 49 in the annular plate 55, which bear against the first coupling member 21.

Operation

The offset indexable fixture 11 is rotatable about the spindle axis 14 for machining of the workpiece 12. This machining may be by a rotatable tool such as a milling cutter, but also expeditiously may be performed by a non-rotating tool such as a boring tool 53 in a boring bar 54. This non-rotating tool and the rotating workpiece combination will machine a first aperture 56 or a whole series of such apertures or surfaces concentric with the spindle axis 14. After all of these surfaces are machine, the spindle rotation may be halted and fluid pressure applied through the inlet coupling 27. This will move the piston 26 and axle 34 to the right, which moves the spider 37, faceplate 40, and workpiece 12 to the right, as viewed in FIG. 2. This movement need not be very far, e.g., less than one-half inch, in order to uncouple the previously coupled teeth on the coupling members 21 and 22. In this condition, the faceplate may be indexed by power, or by hand, to a different angular position. In the preferred embodiment, this includes an indexing of 180 degrees, and stops 62 may be provided to limit such arcuate indexing if desired. After indexing, the fluid pressure may be terminated and the springs 32 will push the piston 26 back to the left to the position shown in FIG. 2. This moves the coupling members into coupled engagement. The lathe spindle 13 may again be rotated and the boring bar tool used to machine a second aperture 57 or series of concentric apertures or surfaces which are at that time concentric with the spindle axis 14. Thus, the second aperture is formed which is at a location in the workpiece 12 different from the first aperture 56. In this preferred embodiment with the 180-degree indexing, the spacing between the axis 58 of the aperture 57 and spindle axis 14 is twice the spacing between the spindle axis 14 and indexing axis 25.

The offset indexable fixture of the present invention includes the backplate 18 which is adapted to be secured to a rotatable work spindle 13 and rotate about the axis 14. The faceplate 40 is journaled for rotation relative to the backplate 18 about the offset indexing axis 25. The first and second cooperable toothed coupling members 21 and 22 are concentric with the indexing axis. The first coupling member 21 is rotationally fixed relative to the backplate 18 by screws 23, and the second coupling member 22 is rotationally fixed to the faceplate by being integral therewith for concurrent rotation about the spindle axis 14 when coupled together. The fluid pressure acting on piston 26 and the springs 32 are a means to relatively move the first and second toothed coupling members along the indexing axis 25 to couple and uncouple these coupling members. When uncoupled, the second coupling member is capable of rotation independent of the first coupling member about the indexing axis 25.

The present disclosure includes that contained in the appended claims, as well as that of the foregoing description. Although this invention has been described in its preferred form with a certain degree of particularity, it is understood that the present disclosure of the preferred form has been made only by way of example, and that numerous changes in the details of construction and the combination and arrangement of parts may be resorted to without departing from the spirit and the scope of the invention as hereinafter claimed.

What is claimed is:

1. An offset indexable fixture comprising, in combination:
   a backplate and a faceplate;
   means to journal said faceplate relative to said backplate for rotation about an indexing axis;
   means to secure a workpiece on said faceplate;
   first and second cooperable coupling members concentric with said indexing axis;
   means to rotationally fix said first coupling member to said backplate and said second coupling member to said faceplate for concurrent rotation when coupled together;
   means to relatively move said first and second coupling members along said indexing axis to couple and uncouple said coupling members for independent rotation of said second coupling member about said indexing axis when uncoupled; and
   means to mount said backplate to a rotatable work spindle having a spindle axis parallel to and spaced from said indexing axis to establish a first aperture machinable in the rotating workpiece concentric with said spindle axis, and to establish a second aperture machinable concentric with said spindle axis upon indexing said faceplate through an angle about said indexing axis and recoupling said coupling members, said second aperture in the rotating workpiece being at a location spaced from the first aperture.

2. An offset indexable fixture as set forth in claim 1, including counterweight means secured on said backplate to substantially dynamically balance the offsetting of the parts concentric with said indexing axis relative to said spindle axis.

3. An offset indexing fixture as set forth in claim 2, including a shoulder acting on said backplate substantially parallel to said spindle axis to receive a complementary shoulder on said counterweight to resist centrifugal force therein.

4. An offset indexable fixture as set forth in claim 1, wherein said relative movement means includes fluid pressure means.

5. An offset indexable fixture as set forth in claim 1, wherein said relative movement means includes spring means.

6. An offset indexable fixture as set forth in claim 1, wherein said coupling members have curvic coupling teeth lying in a plane normal to said indexing axis.

7. An offset indexable fixture as set forth in claim 1, wherein the machinable first and second apertures in the workpiece are machinable by a non-rotating tool acting on the rotatable workpiece.

8. An offset indexable fixture as set forth in claim 1, wherein said faceplate is secured to said second coupling member for axial movement along said indexing axis in accordance with said relative movement means.

9. An offset indexing fixture as set forth in claim 1, wherein said relative movement means is offset from said spindle axis substantially concentric with said indexing axis.

10. An offset indexing fixture as set forth in claim 1, wherein said faceplate is actuated by said second coupling member to move away from said backplate as said coupling members are uncoupled.

11. An indexable fixture comprising; in combination:
a backplate;
means to mount said backplate concentrically secured to a workpiece spindle of a lathe;
a coupling ring secured to said backplate having an indexing axis parallel to and displaced from the axis of said lathe workpiece spindle by a predetermined distance;
a fluid cylinder in said coupling ring concentric with said indexing axis;
a fluid piston axially movable in said fluid cylinder;
an axle secured to said piston for longitudinal movement therewith;
said coupling ring having first curvic coupling teeth thereon in a plane normal to said indexing axis;
a faceplate having second curvic coupling teeth thereon complementary to said first curvic coupling teeth concentric with said indexing axis and mounted for longitudinal movement relative to said coupling ring;
a spider longitudinally movable with and journaled on said axle about said indexing axis and secured to said faceplate;
spring means acting between said coupling ring and said piston and acting to urge said piston toward said backplate;
a fluid pressure inlet to said cylinder; and
means on said faceplate to radially and angularly locate a workpiece securable to said faceplate for machining a first aperture in the workpiece concentric with said lathe spindle axis, and whereby fluid pressure may be applied to said piston to move said piston away from said backplate and compress said spring means to separate said curvic coupling teeth, whereby said spider, faceplate, and workpiece may be indexed 180 degrees and the fluid pressure released so that the curvic coupling teeth again mesh, and whereby a second aperture is machinable in the workpiece concentric with said lathe spindle axis which is spaced from the first aperture in the workpiece by twice said predetermined distance.

12. An indexable fixture as set forth in claim 11, including a counterweight secured to said backplate to counterbalance the mass of parts concentric with said indexing axis.

13. An indexable fixture as set forth in claim 11, including an adapter plate secured between said backplate and the lathe spindle.

* * * * *

UNITED STATES PATENT AND TRADEMARK OFFICE
CERTIFICATE OF CORRECTION

PATENT NO. : 4,827,801

DATED : May 9, 1989

INVENTOR(S) : Nagle V. Gusching

It is certified that error appears in the above-identified patent and that said Letters Patent is hereby corrected as shown below:

Column 2, line 8 "work piece" should be --workpiece--.

Column 3, line 17 "a" should be --A--.

Column 3, line 51 "machine" should be --machined--.

Signed and Sealed this

Thirtieth Day of January, 1990

*Attest:*

JEFFREY M. SAMUELS

*Attesting Officer*  *Acting Commissioner of Patents and Trademarks*